Figure 1:
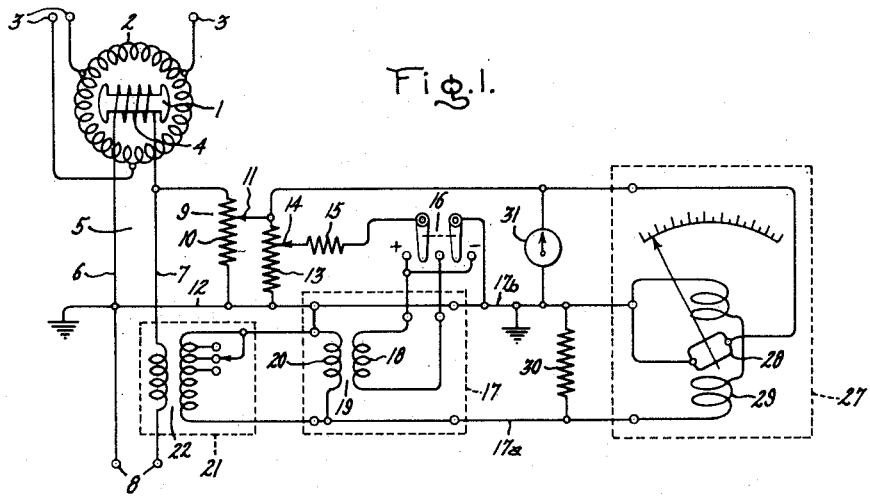

Sept. 26, 1950  F. S. ROTHE  2,523,781
ELECTRIC COMPUTER
Filed Jan. 28, 1950

Inventor:
Frederick S. Rothe,
by Ernest H. Britton
His Attorney.

Patented Sept. 26, 1950

2,523,781

UNITED STATES PATENT OFFICE 2,523,781

ELECTRIC COMPUTER

Frederick S. Rothe, Schenectady, N. Y., assignor to General Electric Company, a corporation of New York Application January 28, 1950, Serial No. 140,980

8 Claims. (Cl. 235—61)

My invention relates to electric computers and more particularly to electric computers suitable for use with a generator unit of a network analyzer in power system transient stability studies.

The purpose of the study of transient stability in a machine power system is to determine the inherent power stability of a given system when subjected to various fault conditions. The criterion for stability is whether or not all the machines return to oscillate around relative angular displacements or if one or more machines pull out of step with the other machine groups. The change in the relative angular displacements of each machine as the fault is applied is therefore a direct indication of the stability of the system and information is desired as to the resulting angular "swing curve" of each machine. The construction of this swing curve for each machine involves the solution of a difficult set of simultaneous differential equations which can most easily be determined and solved by the use of a network analyzer.

The general method presently employed in the art is to represent the electric power system under observation by a similar system upon the network analyzer, balance the loads and power generating circuits of the analyzer in accordance with the desired initial conditions, introduce the fault condition under investigation to the system, and perform a step by step determination of the successive angular positions of each machine respectively at the ends of discrete time intervals of short arbitrary predetermined length in the order of 0.05 to 0.10 second. The power output and acceleration of each machine are assumed to be constant during these short intervals and the change in the angular position of each machine during the interval is computed from the discrete constant power output readings of the network analyzer for each machine during each interval. These successive angular positions are then plotted to yield the swing curve for each machine.

More specifically, in this method each machine in the power system is represented by a Selsyn-type generator unit in the network analyzer. Each generator unit commonly has a three phase stator winding excited by a common three phase power supply of the network analyzer and a single phase rotor winding connected to the electric network representing other parts of the system. These Selsyn-type generator units operate as transformers; the angular position of each rotor being adjustable to duplicate the phase relationships of the corresponding machines in the power system.

In setting up the problem under study, the initial power output and the initial angular setting for each generator unit are determined under the balanced initial conditions. The desired fault condition is then imposed upon the network to initiate transient conditions and the power output of each generator unit is again determined. The change in power output from the initial power output of a generator unit represents the accelerating torque acting upon the corresponding machine in the power system as follows:

$$\Delta P = P_1 - P_0$$

where $\Delta P$=the accelerating torque (differential power output)
$P_1$=the power output of the machine at its initial setting which is assumed to be constant throughout the disturbance
$P_0$=power output of the machine during the particular time interval involved When this accelerating torque is known, together with an acceleration constant determined for each machine from its design data, the change in angular position of each machine during the first time interval can be computed in accordance with the following relationship:
Initial incremental angular displacement= $\frac{1}{2}[K(\Delta P)]$ where K is the acceleration constant. The factor $\frac{1}{2}$ need only be employed in computing this initial incremental angular displacement.

This initial incremental angular displacement added to the initial angular position, yields a new angular position for each machine. The generator units are now adjusted to the new angle thus computed, power outputs are again determined and changes noted from the initial outputs existing before the initiation of transient conditions, and the above computations are repeated to determine the changes in angular positions occuring during the second time interval. This procedure is repeated for as many intervals as are necessary to construct the desired swing curves. The incremental angular displacement for each interval after the initial interval is computed for each machine from the following expression:

$$\Delta \phi_n = K(\Delta P) + \Delta \phi_{n-1}$$

where $\Delta \phi$ = the incremental angular dislacement and $n$ indicates the number of a particular time interval.

Each new angular setting of the generator is computed from the expression $$\phi_n = \Delta \phi_n + \phi_{n-1}$$

or:

$$\phi_n = K(\Delta P) + \Delta \phi_{n-1} + \phi_{n-1}$$

where $\phi$ = the angular setting of the generator and $n$ indicates the interval involved.

With several persons making the necessary computations this method requires from three to four hours to solve a twelve machine problem.

An object of my invention is to provide apparatus for making these computations electrically so that one person can solve the same problem in from one to two hours.

Another object of my invention is to provide an electric computer suitable for use with a generator unit of a network analyzer in such power system transient stability studies which is capable of providing a direct indication of either the acceleration constant times the acceleration torque $K(\Delta P)$, the incremental angular displacement during a particular interval, $(\Delta \phi_n)$, or the successive angular positions of a machine in a power system under investigation during each interval $(\phi_n)$.

In general, a preferred form of my invention includes a power responsive apparatus, such as a simple wattmeter, whose voltage sensitive element is connected to be responsive to a substantially constant reference voltage corresponding to the voltage existing across the output circuit of an associated generator unit and whose current sensitive element is connected to be selectively responsive to electric currents representing the magnitudes of $K(\Delta P)$, $\Delta \phi_n$ and $\phi_n$ respectively during each time interval involved. These electric currents are derived from impedances connected in circuit relation with the output circuit of the generator unit and the power responsive apparatus may be calibrated to give a direct indication of the angles equal to the values of $K(\Delta P)$, $\Delta \phi_n$, and $\phi_n$ respectively for each interval.

One of the principal features of my invention, which greatly simplifies its construction, results from a recognition of the existence of the following relationship:

$$K(\Delta P) = KP_1 - KP_0$$

This relationship enables an electrical solution of the magnitude of $K(\Delta P)$ by the simple expedient of subtracting two electrical quantities; one representing the initial power output times a constant value and the other representing the power output during successive subsequent intervals times the same constant value.

Figure 2:
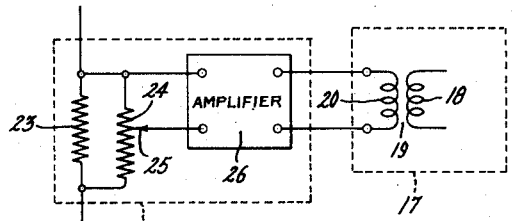
Figure 3:
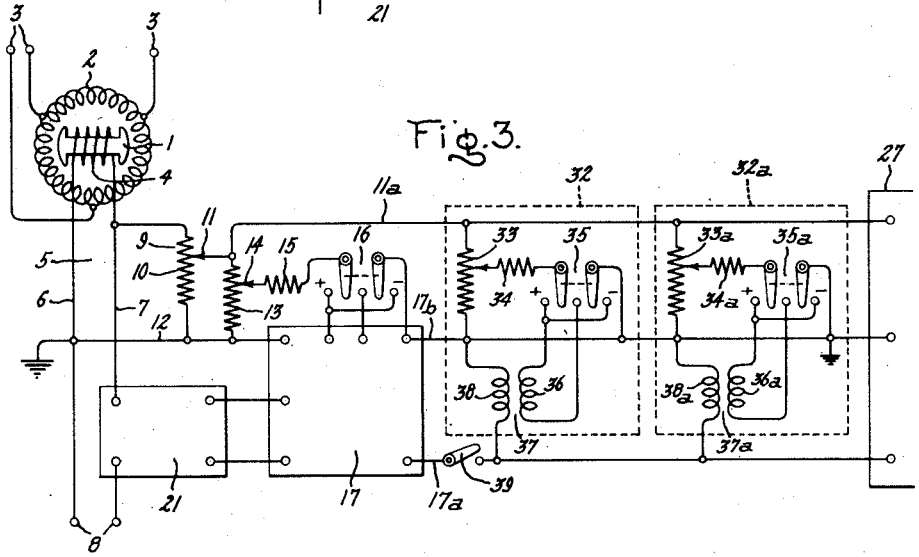

The novel features which I believe to be characteristic of my invention are set forth with particularity in the appended claims. My invention itself however, together with further objects and advantages thereof can best be understood by reference to the following description taken in connection with the accompanying drawings in which Fig. 1 is a circuit diagram of an electric computer embodying my invention which provides a direct indication of the magnitude $K(\Delta P)$, Fig. 2 is a circuit diagram of a modification of a portion of a circuit of Fig. 1 and Fig. 3 is a circuit diagram of an electric computer which selectively provides a direct indication of the magnitudes $K(\Delta P)$, $\Delta \phi_n$ and $\phi_n$ respectively.

Referring now to Fig. 1, I have shown my invention in one form as employed in conjunction with a generator unit 1 of a network analyzer. The generator unit 1 is preferably of the Selsyn type including a three-phase stator winding 2 excited through terminals 3 from the common three-phase power supply bus of the network analyzer and a single-phase rotor winding 4 connected in an output circuit 5 through a pair of output lines 6 and 7 and output terminals 8 to a network (not shown) representing an electric power system. By adjusting the rotational position of the rotor winding 4, an output voltage is supplied in the output circuit 5 through the terminals 8 to the electric network studies whose magnitude and phase angle may be adjusted to a value which simulates the output of one of the machines in the power system.

In order to derive a substantially constant reference voltage equal to unity in the common voltage base of the network analyzer representing an arbitrarily selected voltage magnitude of the power system, I employ a voltage dividing network 9 comprising a potentiometer 10 preferably connected between the output lines 6 and 7. This substantially constant reference voltage is provided at an adjustable tap 11 of the potentiometer 10. Alternatively, the voltage dividing network 9 may be connected to be energized by the output voltage of an independent generator unit (not shown) similar to unit 1 which is adjusted to provide a voltage of the same phase angle as the output of the generator unit 1. I have found, however, that the load introduced by the direct connection of the voltage dividing network 9 to the output lines 6 and 7 of the generator unit 1 as shown in Fig. 1, is not sufficient to cause any appreciable errors in the resulting computations and the necessity of an additional generator unit is thereby eliminated. In order to further simplify the electric connections of the various electric elements in the computer, one line, such as line 6, may be grounded to a common terminal board indicatd by line 12 in Fig. 1, and all electric elements which are to be connected to that line are connected instead to this terminal board 12 which will hereafter be referred to as "ground."

In order to produce an electric quantity representing the power output of the generator unit at its initial angular setting times a given acceleration constant ($KP_1$), an impedance 13 is connected between the reference voltage tap 11 and ground which has an output connection providing an output voltage adjustable in magnitude. The impedance 13 may conveniently be a resistive potentiometer having a variable tap 14, as indicated, although various adjustable inductive or capacitive voltage dividing networks, well known in the art, may alternatively be employed. With such reactive elements, however, phase shifting correction factors should be introduced in the circuit to compensate for any consequent shift in the phase angle of the output voltage.

The voltage developed between the tap 14 of impedance 13 and ground is supplied through a current limiting resistance, 15, and through a current reversing double-pole double-throw switch 16 to one input circuit of an electric subtracting network 17 which may conveniently comprise one winding 18 of a 1 to 1 turn ratio transformer 19. Each winding of the transformer 19 is connected as an independent input circuit of the electric subtracting network to receive voltage from independent sources and a differential output current is taken across one of the windings, such as winding 20 through output lines 17a and 17b or may be taken across a tertiary winding (not shown).

In order to produce an electric quantity representing the power output of the generating unit at each successive angular setting times the given acceleration constant ($KP_0$) which is to be supplied to an independent input circuit of the electric subtracting network, an impedance means 21, adapted to provide an adjustable voltage output, is connected in series with the output circuit of the generator unit 1. The adjustable impedance means 21 may comprise a variable ratio current transformer 22 having a primary winding connected in line 6 and a variable tap secondary winding connected to deliver an output current proportional to the current in the output circuit of the generator unit 1 and adjustable in magnitude to the winding 20 of the electric subtracting network 17. The output current produced by the impedance means 21 is connected to the subtracting network 17 in a proper polarity such that, when the reversing switch 16 is thrown to a plus (+) position, the current induced in winding 20 by the current flowing in winding 18 will be in opposition to the current produced in winding 20 by the output of impedance means 21. Since the transformer 19 has a 1 to 1 turn ratio, equal input currents flowing in windings 18 and 20 of transformer 19 will cancel with the result that no current will be delivered to the output lines 17a and 17b of the subtracting network 17.

An alternative construction of the impedance means 21 which produces no appreciable load upon the generator unit output circuit 5 is shown in Fig. 2. A small impedance 23 is connected in series with output line 7 and potentiometer 24 of high impedance is connected in shunt with the series connected impedance 23 in order to permit a low wattage potentiometer to be used. The impedance 23 itself may, of course, comprise a voltage dividing potentiometer thereby eliminating the necessity for potentiometer 24. The voltage drop developed between one end of the potentiometer 24 and a movable tap 25 thereof is supplied to any conventional amplifying means designated in Fig. 2 as block 26. The output current produced by the amplifier is connected to be delivered to an independent input circuit of the electric subtracting network, such as the winding 20 of the transformer 19, the remainder of the circuit being identical with that of Fig. 1.

Referring again to Fig. 1, a power responsive apparatus 27, which may be an ordinary wattmeter, is connected to give a reading in accordance with the magnitude of the reference voltage produced at tap 11 of potentiometer 10 and the magnitude of the output current delivered thereto from the electric subtracting network 17. The reference voltage produced at tap 11 is supplied through a direct connection to a voltage sensitive element 28 of the power responsive apparatus 27 while a current sensitive element 29 is energized by being directly connected in series circuit relation with the output circuit of the subtracting network 17. A current shunt 30 may be connected across the current sensitive element 29 as indicated. It will be appreciated that a voltage amplifier may be employed to amplify the voltage produced at tap 11 before it is applied to the voltage sensitive element 28, if desired; and that similarly, a current amplifier may be employed to amplify the output current of the subtracting network before it is supplied to the current sensitive element 29.

The above described circuit of Fig. 1, or as modified in accordance with Fig. 2, is a complete operative computer which when properly adjusted as explained hereinafter gives a direct indication of the magnitude of the acceleration constant times the accelerating torque $[K(\Delta)p)]$ and thereby solves the most difficult of the computations to be made in constructing the swing curve. In the operation of this computer the rotor of the generator unit 1 is first adjusted to an angle simulating the initial angular displacement of a corresponding machine in the power system under investigation during stable conditions. The tap 11 of potentiometer 10 is then adjusted to provide a voltage equal to unity in the voltage base employed in the network analyzer. This voltage may be determined by a voltmeter 31 connected between tap 11 and ground. The magnitude of the acceleration constant times the power output of the machine during these initial stable conditions is then computed. The output voltage supplied by impedance means 21 to the electric subtracting network 17 is set at zero so that no input current flows in winding 20 and with the reversing switch in a proper position according to the sign of this computed value the tap 14 of potentiometer 13 is adjusted until the power responsive apparatus 27 gives an indication equal to this computed value. The output voltage of the impedance means 21 delivered to the subtracting network 17 is then adjusted until the indication of the power responsive apparatus 27 returns to zero. The output current of the electric subtracting network 17 which is delivered to the current sensitive element 29 of the power responsive apparatus 27 is now proportional to the value of $KP_1 - KP_0$ during initial stable conditions and, of course, is equal to zero. The proportionality constant K have been introduced into the currents flowing in the windings 18 and 20 of the transformer 19 by the adjustment of the tap 14 of potentiometer 13 and the tap of the secondary winding of the transformer 22 in Fig. 1 or the tap 25 of potentiometer 24 in the impedance means 21 illustrated in Fig. 2. The desired fault condition is now introduced into the system and the change in power output of the generator unit 1 causes a corresponding change in the current delivered to the electric subtracting network by the series connected impedance means 21. Since the voltage across lines 6 and 7 remains substantially unaffected by the introduction of the fault condition into the system, the current flowing through winding 18 of the electric subtracting network remains substantially unchanged and the power responsive apparatus, therefore, gives a direct indication of the magnitude $KP_1 - KP_0$ [$K(\Delta P)$ or $\Delta\phi$]. This indication is noted and added to the initial angular displacement of the rotor to obtain a new angular setting $(\phi_{n-1} + K(\Delta P))$. The rotor of the generator unit is then readjusted to this new angular position and a new reading taken from the power responsive apparatus 27. This reading is added to the previous reading in order to give the next incremental angular displacement which is then added to the existing angular setting of the generator $[K(\Delta P)+\Delta\phi_{n-1}+\phi_{n-1}]$. This procedure is repeated for as many intervals as desired in order to construct the required swing curve. A chart showing a few representative magnitudes and computations is shown below.

| Before fault | {Initial angular setting—36.00 degrees<br>Initial Power output of rotor+.74 (KVA base 20,000)<br>Acceleration Constant $K$=5.93 ($\Delta t$=0.05 sec)} | | | |
|---|---|---|---|---|
| | Time | $K(\Delta P)$ | $\Delta\phi_n=K(\Delta P)+\Delta\phi_{n-1}$ | $\phi_n=K(\Delta P)+\Delta\phi_{n-1}+\phi_{n-1}$ |
| Fault applied | 0.05<br>0.10<br>0.15 | times ½ =<br>−0.326<br>+0.534<br>−1.156 | −0.326<br>+0.208<br>−0.948 | −36.33<br>−36.12<br>−37.07 |

Referring now to Fig. 3, I have shown an improved form of my invention which enables the incremental angular displacement and the successive angular settings as well as the accelerating torque times the acceleration constant to be read during each interval. The circuit is identical to that of Fig. 1 with the addition of independent variable impedance networks 32 and 32a, connected to supply the current sensitive element 29 of the power responsive apparatus 27 with currents respectively representing the magnitudes of the incremental angular displacement and the successive angular settings of the generator unit during the intervals immediately preceding the interval under examination. Referring to impedance network 32, a variable output impedance means 33, which is preferably a potentiometer, is connected from the reference voltage lead 11a to ground. The variable tap of potentiometer 33 is connected through a current limiting resistance 34 and a reversing switch 35, similar to switch 16, to a primary winding 36 of a transformer 37. A secondary winding 38 of the transformer 37 is connected to deliver current to the current sensitive element of the power responsive apparatus 27.

The variable impedance network 32a is identical with the impedance network immediately described above; the similar elements of the network being indicated by similar reference numerals followed by a distinguishing letter "a." One of these variable output impedance networks, such as network 32, functions to provide a current through the current sensitive element 29 proportional to the incremental angular displacement ($\Delta\phi_{n-1}$), while the other variable output impedance network, such as network 32a, supplies a current to the current sensitive element proportional to the successive angular settings of the machine involved ($\phi_{n-1}$). A switch 39 is also included in output line 17a of the subtracting network 17 to permit disconnection of the current delivered to the power responsive apparatus from the subtracting network 17.

In the operation of the circuit of Fig. 3 the taps of potentiometers 33 and 33a are turned to their grounded position and the rotor of the generator unit 1, and the taps of the potentiometer 10, the potentiometer 13, and the impedance means 21 initially adjusted, with switch 39 closed, in the same manner as previously described in connection with the operation of the circuit of Fig. 1 until the power responsive apparatus 27 reads zero. The potentiometer 33a in the impedance network 32a, chosen to represent the successive angular settings of the machine, is then adjusted until the power responsive apparatus gives a reading equal to the initial angular setting of the machine involved. The fault condition is then imposed upon the network under investigation and the new reading of the power responsive apparatus noted. Switch 39 is then opened and the potentiometer 33 of the impedance network 32 adjusted until the power responsive apparatus again indicates this new reading which represents the new angular setting. The rotor of the generator unit 1 is then reset to this new angular setting and switch 39 is closed. A current will then flow in the current sensitive element of the power responsive apparatus 27 which is equal to $K(\Delta P)$ delivered from the electric subtracting network, plus $\Delta\phi_{n-1}$ delivered from variable impedance network 32, plus $\phi_{n-1}$ delivered from variable impedance network 32a. The power responsive apparatus, therefore, gives a direct indication of the new angular setting of the machine for this interval. This procedure is repeated for as many intervals as desired.

It will be appreciated that the impedance network 32a which delivers a current representing the successive angular settings of the machine during each interval may be omitted leaving a completely operative computer which gives a direct indication of the incremental angular displacement during each interval. The successive angular settings of the machine can then be easily computed by merely adding this indicated incremental angular displacement to the angular setting of the machine during the immediately preceding interval. In addition, it is to be understood, that although I have shown computer circuits in which the power responsive apparatus gives a direct reading of the magnitudes computed, a "null-deflection" indicating system may alternatively be employed. In such null deflection systems the electrical value to be measured is balanced out by an opposing electrical value derived from an independent source until an indicating instrument reads zero, and the magnitude of this balancing electrical value is read at its source. The construction of such null deflection measuring systems is well known in the art and need not be described here.

It is to be understood that while I have shown particular embodiments of my invention, many modifications can be made; and I, therefore, intend by the appended claims to cover all such modifications as fall within the true spirit and scope of my invention.

What I claim as new and desire to secure by Letters Patent of the United States is:

1. An electric computer for use with a generator unit in a network analyzer in power system transient stability studies wherein the generator unit simulates a machine in the power system studied and has its output circuit connected to a network which simulates other parts of the system, the computer being adapted to compute the value of a known acceleration constant times the difference between the power output of the generator unit at successive angular settings and the power output at a known initial angular setting and comprising a first impedance connected in series circuit relation with the output circuit of the generator unit and having an adjustable tap, power responsive apparatus having a voltage sensitive element and a current sensitive element, a second impedance having an adjustable tap, means to apply a constant reference voltage across said second impedance and said voltage sensitive element respectively having the same relative phase angle as the voltage across the output circuit of said generator unit at each successive angular setting thereof, and an electric subtracting network having two input circuits and an output circuit for providing a current in its output circuit proportional to the difference between voltages respectively applied to each of its input circuits, each input circuit being connected to receive the voltage produced at the adjustable tap of a respective one of said first and second impedances and the output circuit of the electric subtracting network being connected to supply current to said current sensitive element of said power responsive apparatus.

2. An electric computer for use with a generator unit of a network analyzer adapted to compute successive incremental angular displacements of said generator unit during successive angular settings required in power system transient stability studies wherein the generator unit simulates a machine in the power system studied and has its output circuit connected to a network which simulates other parts of the system, the acceleration constant and the initial angular setting for the generator unit being known, comprising power responsive apparatus having a voltage sensitive element and a current sensitive element, a first, a second and a third impedance each having an adjustable tap, said first impedance being connected in series circuit relation with the output circuit of the generator unit, means to apply a constant reference voltage across said second impedance, said third impedance and said voltage sensitive element respectively having the same relative phase angle as the voltage across the output circuit of said generator unit at each successive angular setting thereof, an electric subtracting network having two input circuits and an output circuit for providing a current in its output circuit proportional to the difference between voltages respectively applied to each input circuit, one input circuit being connected to receive the voltage produced at the adjustable tap of said first impedance and the other input circuit being connected to receive the voltage produced at the adjustable tap of said second impedance, the output circuit of the electric subtracting network being connected to supply current to said current sensitive element and including a current disconnecting switch, and circuit means for supplying a current to said current sensitive element proportional to the voltage produced at the adjustable tap of said third impedance.

3. An electric computer for use with a generator unit of a network analyzer, adapted to compute successive angular settings of said generator unit required in power system transient stability studies wherein the generator unit simulates a machine in the power system studied and has its output circuit connected to a network which simulates other parts of the system, the acceleration constant and the initial angular setting for the generator unit being known, comprising power responsive apparatus having a voltage sensitive element and a current sensitive element, a first, a second, a third and a fourth impedance each having an adjustable tap, said first impedance being connected in series circuit relation with the output circuit of the generator unit, means to apply a constant reference voltage across said second impedance, said third impedance and said voltage sensitive element respectively having the same relative phase angle as the voltage across the output circuit of said generator unit at each successive angular setting thereof, an electric subtracting network having two input circuits and an output circuit for providing a current in its output circuit proportional to the difference between voltages respectively applied to each input circuit, one input circuit being connected to receive the voltage produced at the adjustable tap of said first impedance and the other input circuit being connected to receive the voltage produced at the adjustable tap of said second impedance, the output circuit of the electric subtracting network being connected to supply current to said current sensitive element and including a current disconnecting switch, and independent circuit means for supplying current to said current sensitive element proportional to the voltages produced at the adjustable taps of said third and fourth impedances respectively.

4. An electric computer for use with a generator unit of a network analyzer in power system transient stability studies wherein the generator unit simulates a machine in the power system studied and has its output circuit connected to a network which simulates other parts of the system, the computer being adapted to compute the value of a known acceleration constant times the difference between the power output of the generator unit at successive angular settings and the power output at a known initial angular setting and comprising a first impedance connected in series circuit relation with the output circuit of the generator unit and having an adjustable tap, power responsive apparatus having a voltage sensitive element and a current sensitive element, a second impedance having an adjustable tap, a voltage dividing network connected in parallel circuit relation with the output circuit of the generator unit for supplying a constant reference voltage across said second impedance and said voltage sensitive element respectively, an electric subtracting network comprising a transformer having at least two input windings and an output circuit for providing a current in its output circuit proportional to the difference between voltage applied across each of said input windings respectively, each input winding of said transformer being connected to receive the voltage produced at the adjustable tap of a respective one of said first and second impedances and the output circuit of the electric subtracting network being connected to supply current to said current sensitive element of said power responsive apparatus.

5. An electric computer for use with a generator unit in a network analyzer in power system transient stability studies wherein the generator unit simulates a machine in the power system studied and has its output circuit connected to a network which simulates other parts of the system, the computer being adapted to compute the value of a known acceleration constant times the difference between the power output of the generator unit at successive angular settings and the power output at a known initial angular setting, and comprising a transformer of the adjustable turn ratio type having a primary winding and a secondary winding, said primary winding being connected in series circuit relation with the output circuit of the generator, power responsive apparatus having a voltage sensitive element and a current sensitive element, an impedance having an adjustable tap, a voltage dividing network connected in parallel circuit relation with the output circuit of the generator unit for supplying a constant reference voltage across said impedance and said voltage sensitive element respectively, and an electric subtracting network having two input circuits and an output circuit for providing a current in its output circuit proportional to the difference between voltages respectively applied to each of its input circuits, one input circuit being connected to receive the voltage produced across the secondary winding of said transformer and the other input circuit being connected to receive the voltage produced at the adjustable tap of said impedance, and the output circuit of the electric subtracting network being connected to supply current to said current sensitive element.

6. An electric computer for use with a generator unit in a network analyzer in power system transient stability studies wherein the generator unit stimulates a machine in the power system studied and has its output circuit connected to a network which simulates other parts of the system, the computer being adapted to compute the value of a known acceleration constant times the difference between the power output of the generator unit at discrete successive angular settings and the power output of a known initial angular setting, and comprising a first impedance connected in series circuit relation with the output circuit of the generator unit and having an adjustable tap, amplifying means connected to receive and amplify the voltage produced at the adjustable tap of said first impedance, power responsive apparatus having a voltage sensitive element and a current sensitive element, a second impedance having an adjustable tap, a voltage dividing network connected in parallel circuit relation with the output circuit of the generator unit for supplying a constant reference voltage across said second impedance and said voltage sensitive element respectively, and an electric subtracting network having two input circuits and an output circuit for providing a current in its output circuit proportional to the difference between voltages respectively applied to each of its input circuits, one input circuit of said subtracting network being connected to receive the amplified voltage produced by said amplifying means, and the other input circuit being connected to receive the voltage produced at the adjustable tap of said second impedance, and the output circuit of the electric subtracting network being connected to supply current to said current sensitive element.

7. An electric computer for use with a generator unit in a network analyzer adapted to compute successive incremental angular displacements of said generator unit during successive angular settings required in power system transient stability studies wherein the generator unit simulates a machine in the power system studied and has its output circuit connected to a network which simulates other parts of the system, the acceleration constant and the initial angular setting for the generator unit being known, comprising power responsive apparatus having a voltage sensitive element and a current sensitive element, a first, a second and a third impedance each having an adjustable tap, said first impedance being connected in series circuit relation with the output circuit of the generator unit, a voltage dividing network connected in parallel circuit relation with the output circuit of the generator unit for supplying a constant reference voltage across said second impedance, said third impedance and said voltage sensitive element respectively, an electric subtracting network having two input circuits and an output circuit for providing a current in its output circuit proportional to the difference between voltages respectively applied to each input circuit, one input circuit being connected to receive the voltage produced at the adjustable tap of said first impedance and the other input circuit being connected to receive the voltage produced at the adjustable tap of said second impedance, the output circuit of the electric subtracting network being connected to supply current to said current sensitive element and including a current disconnecting switch, and circuit means including a transformer for supplying a current to said current sensitive element proportional to the voltage produced at the adjustable tap of said third impedance.

8. An electric computer for use with a generator unit in a network analyzer, adapted to compute successive angular settings of said generator unit required in power system transient stability studies wherein the generator unit simulates a machine in the power system studied and has its output circuit connected to a network which simulates other parts of the system, the acceleration constant and the initial angular setting for the generator unit being known, comprising power responsive apparatus having a voltage sensitive element and a current sensitive element, a first, a second, a third and a fourth impedance each having an adjustable tap, said first impedance being connected in series circuit relation with the output circuit of the generator unit, a voltage dividing network connected in parallel circuit relation with the output circuit of the generator unit for supplying a constant reference voltage across said second impedance, said third impedance, said fourth impedance and said voltage sensitive element respectively, an electric subtracting network having two input circuits and an output circuit for providing a current in its output circuit proportional to the difference between voltages respectively applied to each input circuit, one input circuit being connected to receive the voltage produced at the adjustable tap of said first impedance and the other input circuit being connected to receive the voltage produced at the adjustable tap of said second impedance, the output circuit of the electric subtracting network being connected to supply current to said current sensitive element and including a current disconnecting switch, circuit means including a transformer for supplying a current to said current sensitive element proportional to the voltage produced at the adjustable tap of said third impedance.

FREDERICK S. ROTHE.

No references cited.

Certificate of Correction

Patent No. 2,523,781 September 26, 1950

FREDERICK S. ROTHE

It is hereby certified that error appears in the printed specification of the above numbered patent requiring correction as follows:

Column 3, line 8, for "dislacement" read *displacement*; column 6, line 15, after the Greek letter "$\Delta$" strike out the closing parenthesis;

and that the said Letters Patent should be read as corrected above, so that the same may conform to the record of the case in the Patent Office.

Signed and sealed this 20th day of March, A. D. 1951.

[SEAL]

THOMAS F. MURPHY,
*Assistant Commissioner of Patents.*